(12) United States Patent
Li et al.

(10) Patent No.: US 12,456,031 B2
(45) Date of Patent: Oct. 28, 2025

(54) NEURAL ARCHITECTURE SEARCH VIA SIMILARITY-BASED OPERATOR RANKING

(71) Applicants: Baidu USA, LLC, Sunnyvale, CA (US); Baidu.com Times Technology (Beijing) Co., Ltd., Beijing (CN)

(72) Inventors: Baopu Li, Santa Clara, CA (US); Yanwen Fan, Beijing (CN); Zhihong Pan, San Jose, CA (US); Teng Xi, Beijing (CN); Gang Zhang, Beijing (CN)

(73) Assignees: Baidu USA, LLC, Sunnyvale, CA (US); Baidu.com Times Technology (Beijing) Co., Ltd., Beijing (CN)

( * ) Notice: Subject to any disclaimer, the term of this patent is extended or adjusted under 35 U.S.C. 154(b) by 921 days.

(21) Appl. No.: 17/058,624

(22) PCT Filed: Sep. 18, 2020

(86) PCT No.: PCT/CN2020/116204
§ 371 (c)(1),
(2) Date: Nov. 24, 2020

(87) PCT Pub. No.: WO2022/056841
PCT Pub. Date: Mar. 24, 2022

(65) Prior Publication Data
US 2022/0092381 A1 Mar. 24, 2022

(51) Int. Cl.
*G06N 3/04* (2023.01)
*G06N 3/08* (2023.01)
(52) U.S. Cl.
CPC .................. *G06N 3/04* (2013.01); *G06N 3/08* (2013.01)
(58) Field of Classification Search
CPC ............ G06N 3/04; G06N 3/08; G06N 3/045; G06N 20/00; G06N 3/082
See application file for complete search history.

(56) References Cited

U.S. PATENT DOCUMENTS

2013/0304744 A1   11/2013   McSherry
2014/0214736 A1    7/2014   Kimmel
(Continued)

FOREIGN PATENT DOCUMENTS

| CN | 107924384 | 4/2018 |
| CN | 108292374 | 7/2018 |
| CN | 111338635 | 6/2020 |

OTHER PUBLICATIONS

Hu et al., "Angle-based Search Space Shrinking for Neural Architecture Search", Jul. 16, 2020, arXiv, v3, pp. 1-21 (Year: 2020).*

(Continued)

*Primary Examiner* — Leonard A Sieger
(74) *Attorney, Agent, or Firm* — Oppedahl Patent Law Firm LLC (57) ABSTRACT

Network architecture search (NAS) received a lot of attention. The supernet-based differentiable approach is popular because it can effectively share the weights and lead to more efficient search. However, the mismatch between the architecture and weights caused by weight sharing still exists. Moreover, the coupling effects among different operators are also neglected. To alleviate these problems, embodiments of an effective NAS methodology by similarity-based operator ranking are presented herein. With the aim of approximating each layer's output in the supernet, a similarity-based operator ranking based on statistical random comparison is used. In one or more embodiments, then the operator that possibly causes the least change to feature distribution discrepancy is pruned. In one or more embodiments, a fair sampling process may be used to mitigate the operators' Matthew effect that happened frequently in previous supernet approaches.

12 Claims, 7 Drawing Sheets

(56) References Cited

U.S. PATENT DOCUMENTS

2016/0267397 A1 9/2016 Carlsson
2017/0132513 A1 5/2017 Yu

OTHER PUBLICATIONS

Li et al., "StacNAS: Towards Stable and Consistent Differentiable Neural Architecture Search", Dec. 11, 2019, arXiv, v4, pp. 1-16 (Year: 2019).*
Cai et al., "ProxylessNAS: Direct Neural Architecture Search Target Task and Hardware", 2019, arXiv, v2, pp. 1-13 (Year: 2019).*
Kamath et al., "Fast Neural Architecture Construction using EnvelopeNets", 2018, arXiv, v3, pp. 1-14 (Year: 2018).*
Ayinde et al., "Redundant feature pruning for accelerated inference in deep neural networks", 2019, Neural Networks, vol. 118, pp. 148-158 (Year: 2019).*
Fang et al., "BETANAS: BalancEd TrAining and selective drop for Neural Architecture Search", Dec. 24, 2019, arXiv, v1, pp. 1-11 (Year: 2019).*
He et al., "Filter Pruning via Geometric Median for Deep Convolutional Neural Networks Acceleration", 2019, Proceedings of the IEEE/CVF Conference on Computer Vision and Pattern Recognition (CVPR), vol. 2019, pp. 4340-4349 (Year: 2019).*
Ide et al., "Robust pruning for efficient CNNs", Jul. 2020, Pattern Recognition Letters, vol. 135, pp. 90-98 (Year: 2020).*
Chu et al., "FairNAS: Rethinking Evaluation Fairness of Weight Sharing Neural Architecture Search", Mar. 10, 2020, arXiv, v4, pp. 1-23 (Year: 2020).*
Cai et al., "Proxylessnas: Direct neural architecture search on target task and hardware," arXiv preprint arXiv:1812.00332, 2019. (13pgs).
Chen et al., "Progressive differentiable architecture search: Bridging the depth gap between search and evaluation," arXiv preprint arXiv:1904.12760, 2019. (10pgs).
Chen et al., "DetNAS: Neural architecture search on object detection," arXiv preprint arXiv:1903.10979, 2019. (12pgs).
Dong et al., "Searching for A Robust Neural Architecture in Four GPU Hours," arXiv preprint arXiv:1910.04465, 2019. (10pgs).
Dong et al., "Network pruning via transformable architecture search," arXiv preprint arXiv:1905.09717, 2019. (12pgs).
Elsken et al., "Efficient Multi-objective Neural Architecture Search via Lamarckian Evolution," arXiv preprint arXiv:1804.09081, 2019. (23pgs).
Ghiasi et al., "NAS-FPN: learning scalable feature pyramid architecture for object detection," arXiv preprint arXiv:1904.07392, 2019. (10pgs).
Guo et al., "Single path one-shot neural architecture search with uniform sampling," arXiv preprint arXiv:1904.00420, 2020. (16pgs).
P. Langley, "Crafting papers on machine learning," Proc of the 17th Int'l Conf on Machine Learning (ICML), 2000. (6pgs).
Li et al., "STACNAS: Towards Stable and Consistent Differentiable Neural Architecture Search," arXiv preprint arXiv:1909.11926, 2019. (16pgs).
Xie et al., "SNAS: stochastic neural architecture search," arXiv preprint arXiv:1812.09926, 2020. (17pgs).
Xu et al., "PC-DARTS: partial channel connections for memory-efficient differentiable architecture search," arXiv preprint arXiv:1907.05737, 2020. (13pgs).
Zhang et al., "You only search once: Single shot neural architecture search via direct sparse optimization," arXiv preprint arXiv:1811.01567, 2018. (11pgs).
Zhou et al., "BayesNAS: A bayesian approach for neural architecture search," arXiv preprint arXiv:1905.04919, 2019. (25pgs).
Zhou et al., "One-shot neural architecture search through A posteriori distribution guided sampling," arXiv preprint arXiv:1906.09557, 2019. (10pgs).
Zoph et al., "Neural architecture search with reinforcement learning," arXiv preprint arXiv:1611.01578, 2017. (16pgs).
Zoph et al., "Learning transferable architectures for scalable image recognition," arXiv preprint arXiv:1707.07012, 2018. (14pgs).
Zheng et al., "Multinomial Distribution Learning for Effective Neural Architecture Search," arXiv preprint arXiv:1905.07529, 2019. (10pgs).
Liang et al., "DARTS+: Improved Differentiable Architecture Search with Early Stopping," arXiv preprint arXiv:1909.06035, 2020. (15pgs).
Liang et al., "Evolutionary architecture search for deep multitask networks," arXiv preprint arXiv:1803.03745, 2018. (8pgs).
Liu et al., "Auto-DeepLab: Hierarchical Neural Architecture Search for Semantic Image Segmentation," arXiv preprint arXiv:1901.02985, 2019. (11pgs).
Liu et al., "DARTS:differentiable architecture search," arXiv preprint arXiv:1806.09055, 2019. (13pgs).
Luo et al., "Understanding and Improving One-shot Neural Architecture Optimization," arXiv preprint arXiv:1909.10815, 2019. (8pgs).
Pham et al., "Efficient neural architecture search via parameter sharing," arXiv preprint arXiv:1802.03268, 2018. (11pgs).
Real et al., "Regularized evolution for image classifier architecture search," arXiv preprint arXiv:1802.01548, 2019. (16pgs).
Song et al., "Efficient Residual Dense Block Search for Image Super-Resolution," arXiv preprint arXiv:1909.11409, 2019. (9pgs).
Sun et al.,"Evolving deep convolutional neural networks for image classification," arXiv preprint arXiv:1710.10741, 2019. (13pgs).
Wu et al., "Fbnet: Hardware aware efficient convnet design via differentiable neural architecture search," arXiv preprint arXiv:1812.03443, 2019. (10pgs).
International Search Report in PCT/CN2020/116204, mailed Jun. 18, 2021.
Written Opinion in PCT/CN2020/116204, mailed Jun. 18, 2021.
Suzuki, Kenji et al., "Neural Edge Enhancer for Supervised Edge . . . ", IEEE Transactions on Pattern Analysis and Machine Intelligence, ,vol. 25, No. 12, Dec. 31, 2003.

* cited by examiner

NEURAL ARCHITECTURE SEARCH VIA SIMILARITY-BASED OPERATOR RANKING

CROSS-REFERENCE TO RELATED APPLICATIONS

This patent application is filed pursuant to 35 USC § 371 as a US National Phase Application of International Patent Application No. PCT/CN2020/116204, filed on 18 Sep. 2020, entitled "NEURAL ARCHITECTURE SEARCH VIA SIMILARITY-BASED OPERATOR RANKING," listing Baopu Li, Yanwen Fan, Zhihong Pan, Teng Xi, and Gang Zhang as inventors, which patent document is incorporated by reference herein in its entirety and for all purposes.

A. TECHNICAL FIELD

The present disclosure relates generally to systems and methods for computer learning that can provide improved computer performance, features, and uses. More particularly, the present disclosure relates to efficient approaches that overcome the problems in traditional neural architecture search.

B. BACKGROUND

Deep learning has been considered as the most successful story in the recent recurrence of artificial intelligence. Deep neural networks have achieved great successes in many domains, such as computer vision, natural language processing, recommender systems, etc. However, the design of a specified neural architecture in different tasks has been challenging. The emergence of neural architecture search (NAS) approaches aims to automate the process of neural architecture design. Early works along this novel direction tend to apply a reinforcement learning (RL) approach to traverse the huge search space for possible neural network architectures. Then, evolution-based approaches have been further utilized to obtain a possible optimal solution in the large search space. Both of these two kinds of approaches are computationally intensive because NAS is treated as a black box optimization problem in a discrete domain, yielding a large number of architecture evaluations, and thus run very slow—even on the most advanced GPU machine.

To attempt to alleviate this bottleneck, H. Liu, K. Simonyan, and Y. Yang proposed in "DARTS: Differentiable Architecture Search," *CoRR*, abs/1806.09055, 2018. URL: arxiv.org/abs/1806.09055, a differentiable approach, referred to as DARTS, to accelerate the search of a good neural network by relaxation of the possible operation on the cell level structure, which may be considered as a breakthrough in the NAS field and opens a new door for many subsequent works. In DARTS, a cell that comprises some nodes, among which the possible edges represent different operations, is searched as the basic building block of the whole neural network, and each cell is represented as a directed acyclic graph (DAG). The architecture parameters that denote the importance of the operation may be updated through a gradient descent method in the search process together with the training process of the network's weight. Gradient-based search using Differentiable Architecture Sampler (GDAS), which was proposed by X. Dong and Y. Yang, in "Searching for A Robust Neural Architecture in Four GPU Hours," available at arXiv:1910.04465, October 2019, further speeds up the searching process by only sampling one subgraph in the training process. Some latest works further sample the supernet by applying uniform sampling or a Bayesian method.

The current gradient-based search methods greatly facilitate the search efficiency for NAS, but there is still significant room for improvement. First, the mismatch between the architecture and weights caused by weight sharing still exists; it means that there is a performance discrepancy between the fully trained stand-alone model and the obtained model in the search process, leading to an inconsistency problem. In addition, there exists some coupling effects among similar operators that may dampen the searching efficiency.

Accordingly, what is needed are systems and methods that efficiently overcome the problems in traditional neural architecture search.

SUMMARY

Embodiments of the present disclosure provide a computer-implemented method for performing neural network architecture search, a system, and a non-transitory computer-readable medium or media.

In a first aspect, some embodiments of the present disclosure provide a computer-implemented method for performing neural network architecture search, the method includes: given an initial set of operators for each layer of a set of layers of a supernet that has been pre-trained, iterating steps until a stop condition is reached, the steps comprising: for each layer of the set of layers of the supernet: determining a similarity score for each operator that remains for that layer of the supernet; and removing the operator with a minimum similarity score for that layer of the supernet; forming a new model which comprises, for each layer, a set of operators selected from the operators that remain for that layer; and training the new model using a training data set, in which at least some of the weights in the new model are updated as part of training; using a validation data set on the trained new model to obtain and record, for each layer of the trained new model, similarity scores of operators used in the layers; and responsive to the stop condition that comprises a threshold level or below a number of operators existing for each layer of the set of layers, outputting the trained new model of the last iteration as a final network comprising an operation for each layer of the set of layers of the final network.

In a second aspect, some embodiments of the present disclosure provide a system, the system includes: one or more processors; and a non-transitory computer-readable medium or media comprising one or more sets of instructions which, when executed by at least one of the one or more processors, causes steps to be performed comprising: given an initial set of operators for each layer of a set of layers of a supernet that has been pre-trained, iterating steps until a stop condition is reached, the steps comprising: for each layer of the set of layers of the supernet: determining a similarity score for each operator that remains for that layer of the supernet; and removing the operator with a minimum similarity score for that layer of the supernet; forming a new model which comprises, for each layer, a set of operators selected from the operators that remain for that layer; and training the new model using a training dataset, in which at least some of the weights in the new model are updated as part of training; using a validation dataset on the trained new model to obtain and record, for each layer of the trained new model, similarity scores of operators used in the layers; and responsive to the stop condition that comprises a threshold level or below a number of operators existing for each layer of the set of layers, outputting the trained new model of the last iteration as a final network comprising an operation for each layer of the set of layers of the final network.

In a third aspect, some embodiments of the present disclosure provide a non-transitory computer-readable medium or media comprising one or more sequences of instructions which, when executed by one or more processors, causes steps to be performed comprising: given an initial set of operators for each layer of a set of layers of a supernet that has been pre-trained, iterating steps until a stop condition is reached, the steps comprising: for each layer of the set of layers of the supernet: determining a similarity score for each operator that remains for that layer of the supernet; and removing the operator with a minimum similarity score for that layer of the supernet; forming a new model which comprises, for each layer, a set of operators selected from the operators that remain for that layer; and training the new model using a training dataset, in which at least some of the weights in the new model are updated as part of training; using a validation dataset on the trained new model to obtain and record, for each layer of the trained new model, similarity scores of operators used in the layers; and responsive to the stop condition that comprises a threshold level or below a number of operators existing for each layer of the set of layers, outputting the trained new model of the last iteration as a final network comprising an operation for each layer of the final network.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

Figure ("FIG.") 1 depicts a portion of a directed acyclic representation of a supernet, according to embodiments of the present disclosure.

DETAILED DESCRIPTION OF EMBODIMENTS

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. The terms "include," "including," "comprise," and "comprising" shall be understood to be open terms and any lists the follow are examples and not meant to be limited to the listed items. A "layer" may comprise one or more operations. The words "optimal," "optimize," "optimization," and the like refer to an improvement of an outcome or a process and do not require that the specified outcome or process has achieved an "optimal" or peak state. The use of memory, database, information base, data store, tables, hardware, cache, and the like may be used herein to refer to system component or components into which information may be entered or otherwise recorded.

One skilled in the art shall recognize that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

A. General Introduction

As noted above, the current gradient-based search approaches suffer from at least a couple issues. First, the mismatch between the architecture and weights caused by weight sharing still exists; it means that there is a discrepancy between the fully trained stand-alone model and the obtained model in the search process. And second, there exists some coupling effects among similar operators that may dampen the searching efficiency.

To address the above problems, presented herein are novel neural architecture search approaches with similarity-based operator ranking. By modeling the discrepancy of the operator's feature outputs, one can effectively evaluate the performance of different operators. In the searching process, in one or more embodiments, the contributions of these operators may be ranked based on, for example, a similarity metric or measure of the outputs. In one or more embodiments, the least contributed operator may be iteratively removed. In one or more embodiments, by considering the coupling effects, the operators that may lead to similar effects may be clustered first. Embodiments herein overcome the typical bi-level optimization for gradient-based search methods by minimizing the distribution discrepancy. Moreover, the clustering of the correlated operators further improves the searching efficiency. Preliminary tests on some datasets validate that the tested embodiment can obtain a comparable network with high efficiency.

Some contributions provided by embodiments of the present disclosure include, but are not limited to, the following. First, embodiments provide effective architecture search based on operator ranking by modeling the distribution of the operators' outputs in each layer for a supernet. Prior approaches have searched for the best operator with a reinforcement learning method or evolution-based, which is very time consuming. Second, embodiments help alleviate the mismatch effects. Taking into consideration the discrepancy of the features' output from scratch in the searching process, embodiments herein alleviate the problem of mismatch effectively. In addition, embodiments of the similarity-based sampling of different operators for supernet training may further mitigate this challenging problem. Third, in one or more embodiments, the Matthew effect—that is, some operators that show better performance in the early stage get more training opportunities, while other operators will be trained insufficiently—is mitigated by introducing carefully designed training process embodiments based on an operator's impact. One skilled in the art shall recognize other benefits of an embodiment or embodiments of the present disclosure.

B. Method Embodiments

1. Feature Distribution Discrepancy for a Supernet

Weight sharing can play an important role in the early stage of NAS, it may avoid the previous training and evaluating process for each network in the whole search space, which is a key reason for the long computation time of the early NAS-based works. Therefore, a supernet may be assumed to subsume all the possible network architectures, and the supernet should be trained one time. Then, the trained weights may be taken as the start point for all the subnet architectures, saving considerable time and leading to as much as 1000 times efficiency improvement.

The recent one-shot-based approaches may overcome the coupling effects in the training process of a supernet because the architecture search is decoupled from the training process of a supernet. In one or more embodiments, prediction ability of the network architecture inherited from the supernet is utilized. Most works about supernet mainly focus on the supernet training while ignoring the feature representation ability of the network. Therefore, one or more embodiments herein utilize analysis from the perspective of feature representation of the network structure itself.

Figure 1:
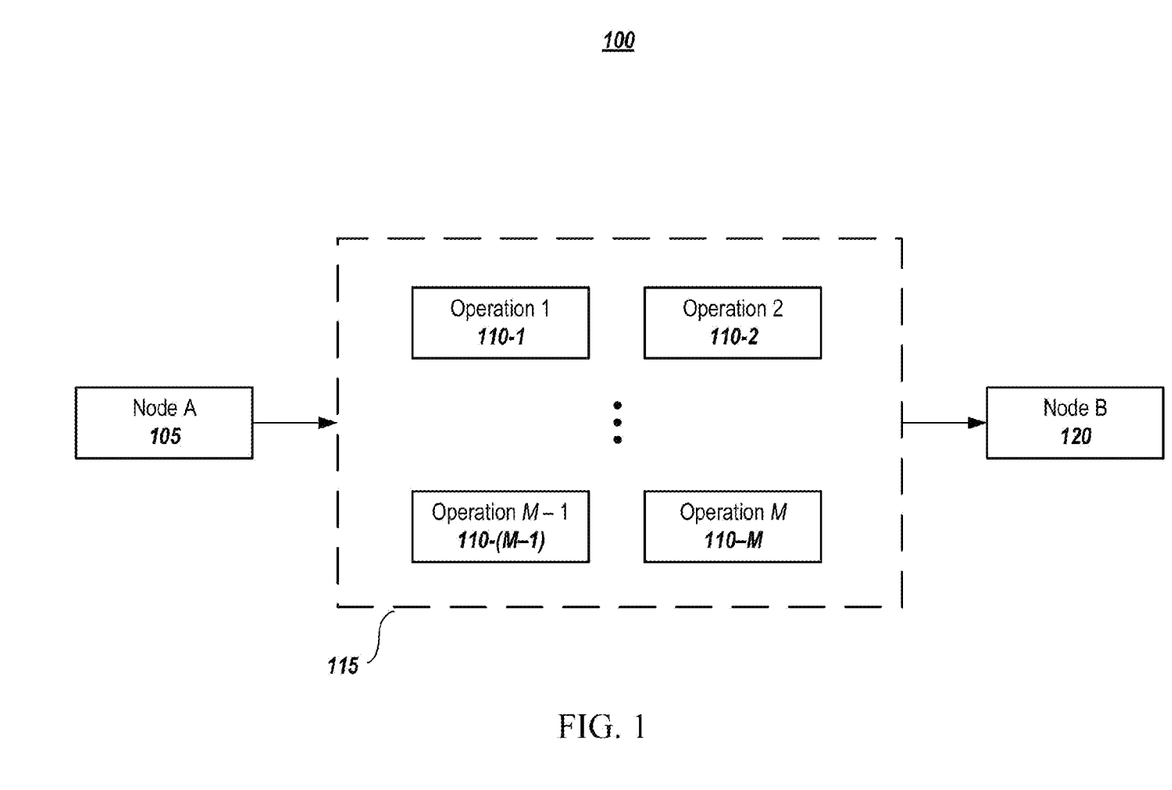

In one or more embodiments, a supernet may be represented as a directed acyclical graph (DAG) comprising nodes and edges. In one or more embodiments, a node represents feature outputs of one or more operators, and the possible edge connections between nodes represent layer operations. FIG. 1 depicts a portion of a directed acyclic representation of a supernet, according to embodiments of the present disclosure. As illustrated, a supernet layer or block 115 comprises M candidate operators (e.g., operation 110-1 through operation 110-M) in a same choice block or layer 115 in the supernet, which may comprise N choice blocks. In the depicted illustration, the layer 115 is an edge between two nodes, Node A 105 and Node B 120, which represent feature outputs. In one or more embodiments, the feature distribution of the ith layer in the supernet is $F_{ij}$ when choosing the jth operator, and the desired optimal feature distributions is $P_{ij}$, then the search process may be formalized as:

$$(\alpha^*, W_\alpha^*) = argmin_{\alpha,W}(L(\alpha, W)) \quad (1)$$

$$\text{where } L(\alpha, W) = \sum_{i=1}^{N}\sum_{j=1}^{M}(Dis(F_{ij}, P_{ij}))$$

where $Dis(F_{ij}, P_{ij})$ is the discrepancy between the feature distribution of each layer in the supernet. In one or more embodiments, the feature distribution discrepancy may be the Kullback-Leibler (KL) divergence.

2. Similarity-Based Feature Output Ranking Embodiments

Based on Eq. (1), a goal is to enable the output of each layer of the supernet, when choosing different operators, to come close to an ideal distribution as much as possible. In practice, the distribution of the supernet may be intractable. Hence, to make the solution feasible, in one or more embodiments, output feature similarity, which is an effective evaluation of the feature output, may be used.

In one or more embodiments, using the final accuracy of the supernet may not be a good gauge of each operator in different layers for at least the following two reasons. First, the supernet is rather hard to train and to get the final prediction accuracy. Second, the coupling effects among different layers may affect each operator's ability or contribution in the final accuracy. To obtain an effective solution to the above problem along the direction of quantitative analysis of each operator's output feature map, one or more embodiments may use similarity of the output of each operator and the average of the different operators in the choice block of a supernet:

$$S_j^i(F_j^i(O_j); F^i(O)) \quad (2)$$

where $S_j^l$ represents the similarity score for the jth operator at in the lth choice block/layer of the supernet, $F_j^l(O_j)$ means the feature output of the jth operator in the lth choice block/layer of the supernet, and $F^l(O)$ is the corresponding desired feature output map for this block or layer, which may be approximated, in one or more embodiments, as an average of the different operators in the choice block of the supernet.

The similarity provides useful hints about this operator's contribution to the final output; as such, it may be considered as a reliable measurement of each operator's ability to output the desired feature map. Experiments also validate that it works well for networks. For a fair comparison of different operators, in one or more embodiments, the ith operator and jth operator may be randomly chosen, and their corresponding similarity with the average outputs of a layer of the supernet when applying these operators all together. The ith operator may be said to be better than the jth operator for one choice block/layer if its similarity is closer to the average output of this layer (which means it has a larger similarity score):

$$S_i^l(F_i^l(O_i);F^l(O))>=S_j^l(O_j);F^l(O)) \qquad (3)$$

where $S_i^l$ is the similarity score for ith operator at layer l, $S_j^l$ is the similarity score for jth operator at layer l, $F_i^l(O_i)$ is the output for the ith operator at layer l, $F_j^l(O_1)$ is the output for the jth operator at layer l, and $F^l(O)$ is the average output of this layer. In one or more embodiments, the similarity may be a cosine similarity metric—although it shall be noted that other similarity or distance measure may be used, including by not limited to $L_2$ or Euclidean distance.

Given this information, a ranking list of different operators for each layer can be obtained. In the searching process, embodiments may use the above-mentioned operator output map ranking and drop out the one that is the least on in this list for each block. Embodiments of a search methodology are presented in more detail below in a subsequent section.

3. Embodiments of Supernet Training Based on an Operator's Impact

In one or more embodiments, an input to the operation pruning is a pre-trained supernet. Accordingly, as aspect of the present disclosure includes embodiments for training a supernet. In one or more embodiments, the supernet may be considered a directed acyclic graph that comprises nodes and edges. The node represents intermediate feature outputs of a set of operators, and the possible edge connections between each two nodes has n possible choices, where n represents the number of operators. For example, the following operators (n=8) may be considered in the construction process of the supernet:

1. identity;
2. 3×3 average pooling;
3. 3×3 max pooling;
4. 3×3 separable convolutions;
5. 5×5 separable convolutions;
6. 3×3 dilated convolutions;
7. 5×5 dilated convolutions; and
8. Zero (i.e., no operation).

For the training process of a supernet, for each connection between two nodes or the choices in the block, in one or more embodiments, all n operators may be chosen in the forward process. In a training step, the operators are sampled fairly to mitigate the problem of Matthew effects. Accordingly, to have fair sampling of operators, embodiments utilize sampling based on operator impact.

For different operators, $O_i$ where i is [1, n], an operator's impact may be based on similarity as defined below:

$$I_i = \Sigma_{j=1}^n S_{ij}, \text{ where } i \neq j \qquad (4)$$

where $S_{ij}$ is the similarity of operator $O_i$ and operator $O_j$ in the same choice block/layer, which is different from that of Eq. (2) since here it is directly considering two operators. Note that, in one or more embodiments, the comparison may be between one operator and a group of other operators. In one or more embodiments, the values of the other operators may be combined and compared with $O_i$ using Eq. (4) or a variant thereof in which j represents a combination of operators. Alternatively, the pair-wise similarities may be computed between $O_i$ and each of the other operators in the group and the values combined. One skilled in the art shall recognize other ways to determine an impact value, which may be applied in the sampling process embodiments herein.

Given an iteration number of Q times, in one or more embodiments, the sampling times of each operator ($Q_i$) satisfy the following condition:

$$Q = \tfrac{1}{2}\Sigma_{i=1}^n Q_i \qquad (5)$$

In one or more embodiments, each operator's total impact in the Q times iteration may be further defined as $Q_i * I_i$.

In one or more embodiments, to ensure a fair impact of different operators in this process, the following equation is defined to hold:

$$\begin{bmatrix} 0 \\ 0 \\ 0 \\ \ldots \\ Q \end{bmatrix} = \begin{bmatrix} I_1 & -I_2 & 0 & \ldots \\ I_1 & 0 & -I_3 & \ldots \\ \ldots & & & \\ I_1 & 0 & \ldots & -I_8 \\ 0.5 & 0.5 & \ldots & 0.5 \end{bmatrix} \times \begin{bmatrix} Q_1 \\ Q_2 \\ Q_3 \\ \ldots \\ Q_8 \end{bmatrix} \qquad (6)$$

Hence, different sampling times $Q_i$ may be obtained with the following solution:

$$Q_i = \frac{\frac{2 \times Q}{I_i}}{\sum_{j=1}^{8} \frac{1}{I_j}} \qquad (7)$$

Thus, a fair sampling process is obtained for each choice block in the supernet training, thereby alleviating the Matthew effects. Note that Eqs. (5)-(7) are for an embodiment in which two operators are sampled each iteration. If a different number of operators, p, were sampled, then the equations may be adjusted accordingly. For example, the ½ in the corresponding equations should be replaced by $$\frac{1}{p}.$$

Figure 2:
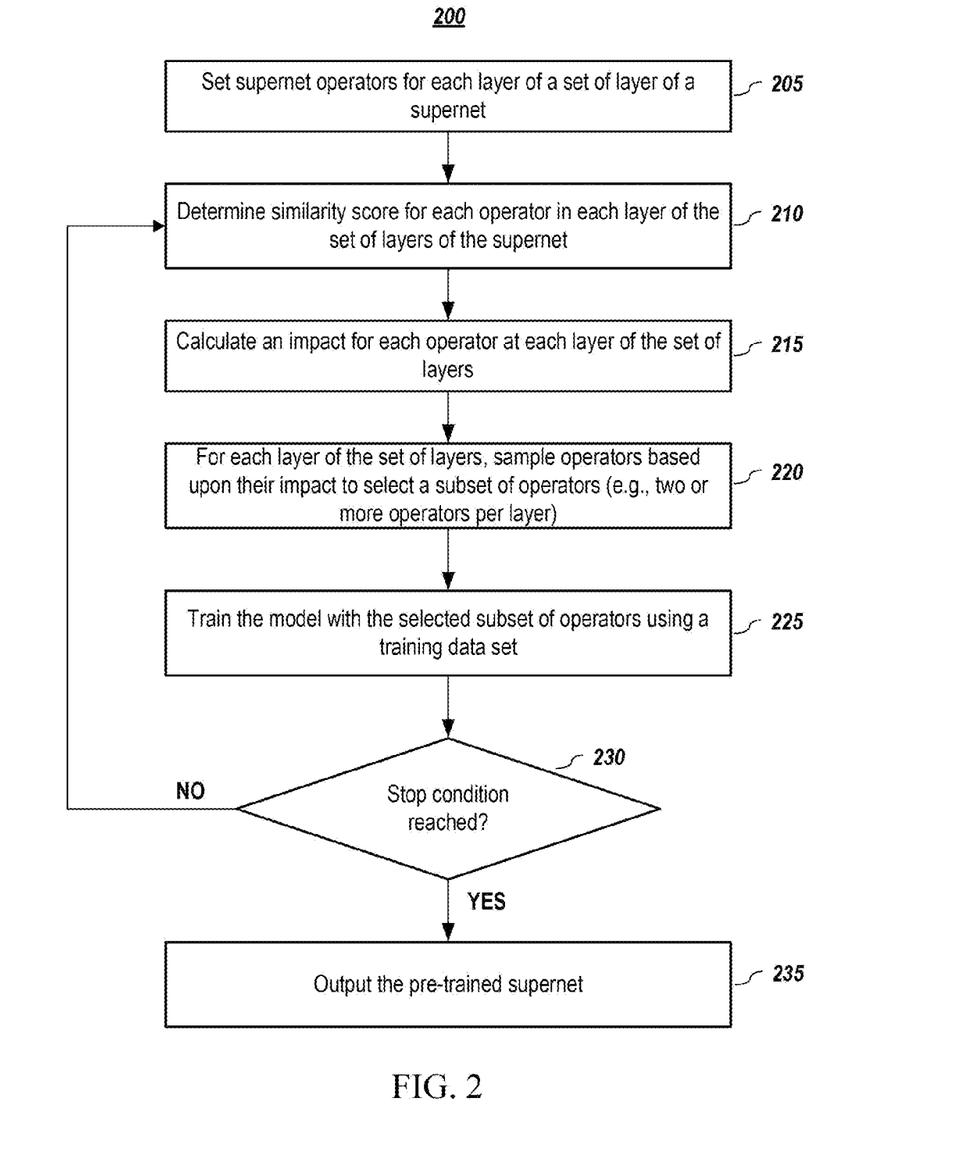
FIG. 2 depicts a method for pre-training a supernet, according to embodiments of the present disclosure.

FIG. 2 depicts a method for pre-training a supernet, according to embodiments of the present disclosure. In one or more embodiments, a set of supernet operators are set (205) for each layer/block of a set of layers of the supernet; it should be noted that, in one or more embodiments, one or more layers of the supernet may not be included in this process. For example, the operators may be a set of eight operators, such as the one listed above—although other operators and different numbers of operators may be selected.

In one or more embodiments, a similarity score for each operator in each layer of the supernet is determined (210). Similarity as described with reference to Eq. (4) may be used. For example, in one or more embodiments, cosine similarity between feature outputs of two operators may be determined. If this iteration is the first iteration and there are no feature output values from which similar scores may be computed, the similarity score may be initialized. In one or more embodiments, the similarity scores may be initialized randomly or to the same values. Given the similarity scores, an impact for each operator at each layer may be calculated (215). In one or more embodiments, the impact values may be calculated using an equation such as Eq. (4). For each choice layer, operators based upon their impacts are sampled (220) to select a subset of operators (e.g., two or more operators per layer). In one or more embodiments, sampling may be performed as discussed above with respect to Equations (5)-(7). In one or more embodiments, the same or different subsets of operators may be used for the different layers.

Given the sampled/selected operators, the model may then be trained (225) with the selected subset of operators using a training dataset until a stop condition is reached (230). Stop condition, in one or more embodiments, may include: (1) a set number of iterations have been performed; (2) an amount of processing time has been reached; (3) convergence (e.g., the difference between consecutive iterations is less than a first threshold value); (4) divergence (e.g., the performance deteriorates); and (5) an acceptable outcome has been reached (e.g., supernet's performance, based upon validation, is sufficiently good).

If a stop condition has been reached, the pre-trained supernet is output (235). In one or more embodiments, the similarity values may also be output.

It shall be noted that embodiments of the supernet training (pre-training) is not a bi-level optimization problem as in DARTS or some other related approaches because the common architecture update step is not considered in the supernet training process. That is, a supernet is built with a set of operators in each choice block, and it is trained after some epochs (with, e.g., direct stochastics gradient descent (SGD) on the weights update). Therefore, the pre-training process of the supernet is rather fast compared to DARTS-related supernet methods.

When pre-training has finished, for each layer of the set of layers for the supernet, it has n possible paths, where n represents the number of operators for the layer. In one or more embodiments, a subsequent operator pruning process in each choice layer may be applied to effectively find the desired sub-network. The next section presents example embodiments for operation pruning.

4. Operator Pruning for NAS Embodiments

Figure 3:
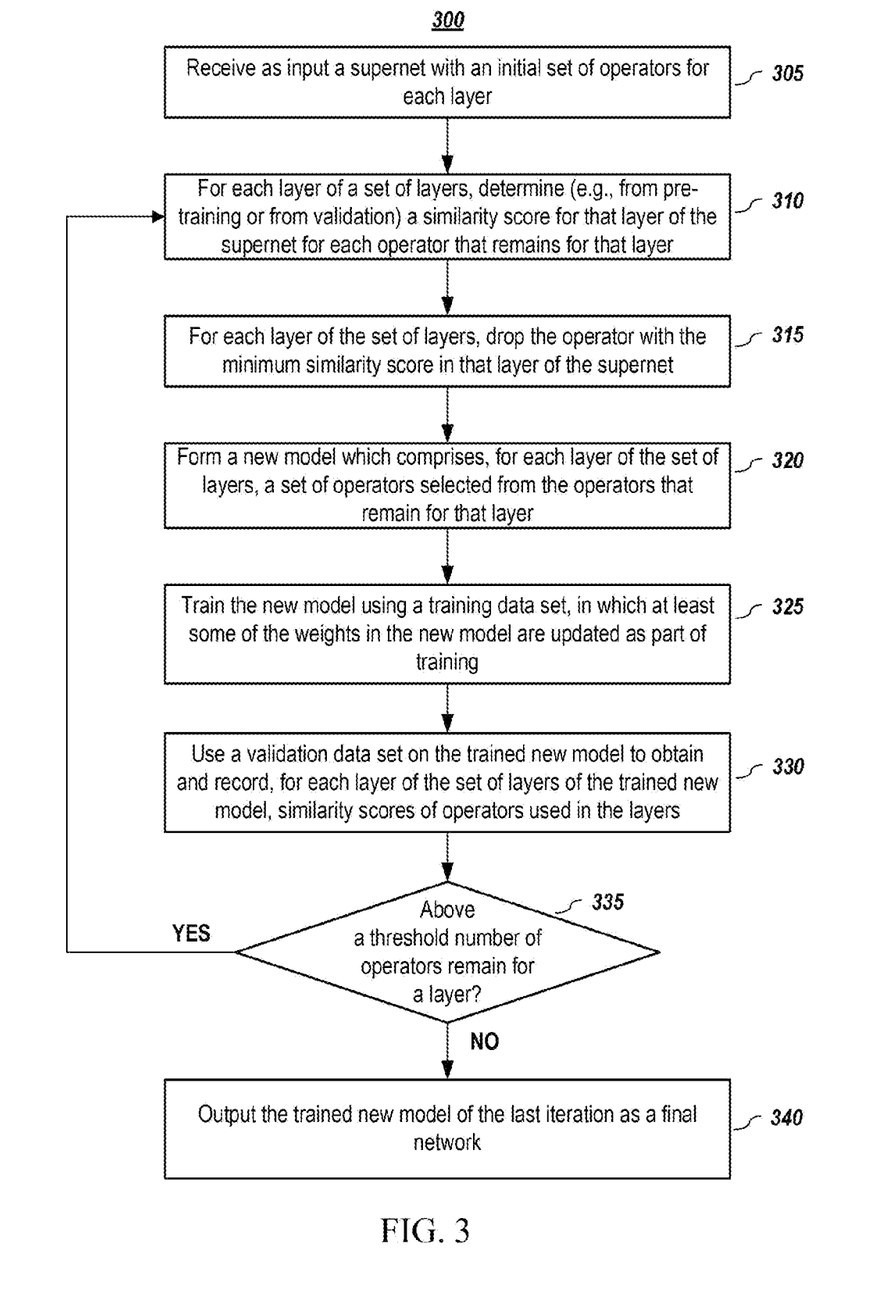
FIG. 3 depicts a method for network architecture search using operator pruning, according to embodiments of the present disclosure.

Embodiments of an operator pruning methodology based on the supernet are presented in this section. FIG. 3 depicts a method for network architecture search using operator pruning, according to embodiments of the present disclosure. As depicted, a supernet with an initial set of operators for each layer is received or decided (305). In one or more embodiments, the supernet may be a pre-trained supernet, which may be pre-trained as described above.

For each layer of a set of layers of the supernet, a similarity score for that layer of the supernet for each operator that remains for that layer is determined (310). In one or more embodiments, the similarity scores may be obtained using, for example, Eq. (2) and data from pre-training or from another sources, such as initialization. In one or more embodiments, during the first iteration, all of the initial operators are present but as the process iterates, operators will be removed; hence, the operators that remain will have their similarity scores determined. Also, as the process iterates, determining the similarity scores may be obtained from validation (step 330) from the prior iteration.

In one or more embodiments, for each layer, the operator with the minimum similarity score in that layer of the supernet is dropped or pruned (315), and a new model is formed (320), which comprises, for each layer, a set of operators selected from the operators that remain for that layer. In one or more embodiments, this set of operators may be all the operators that remain for that layer or a subset thereof.

This new model is trained (325) using a training data set, in which at least some of the weights in the new model are updated as part of training as typically done in machine learning processes. A stop condition, as discussed above, may be used to determine when to stop the training for this new model.

A validation data set may then be used (330) on the trained new model to obtain and record, for each layer of the trained new model, similarity scores of operators used in the layers. As mentioned above, these similarity scores may be used in a next iteration at step 310.

In one or more embodiments, a check is made to determine (335) whether the number of operators remain for a layer is above a threshold number. In one or more embodiments, the threshold number may be one operator per layer, but different numbers may be used and different layers may have different threshold numbers. Responsive to at least one layer having above its threshold number of operators remaining, the process may iterate by returning to step 310.

Responsive to the appropriate number of operators existing for each layer, the trained new model of the last iteration is output (340) as a final network.

5. Embodiments of Clustering for Relative Operators

It shall be noted that, in one or more embodiments, clustering may be used in one or more of the processes above to help reduce the search space. In one or more embodiments, operators that may lead to similar effects may be clustered first. For example, if the layer operators include a 3×3 convolution, a 5×5 convolution, and a 7×7 convolution, the 5×5 convolution may be selected as a proxy for the other convolutions, thereby clustering these operators into a single operator and reducing the search space. In one or more embodiments, the clustering decision may be based upon experimental results, expert knowledge, or a combination thereof. Thus, clustering of the correlated operators may be used to further improve the searching efficiency of embodiments herein.

C. Experimental Results

It shall be noted that these experiments and results are provided by way of illustration and were performed under specific conditions using a specific embodiment or embodiments; accordingly, neither these experiments nor their results shall be used to limit the scope of the disclosure of the current patent document. In the experiments, the cosine distance was applied as the evaluation of similarity due to its simplicity and effectiveness.

1. Operator Consistency

Figure 4:
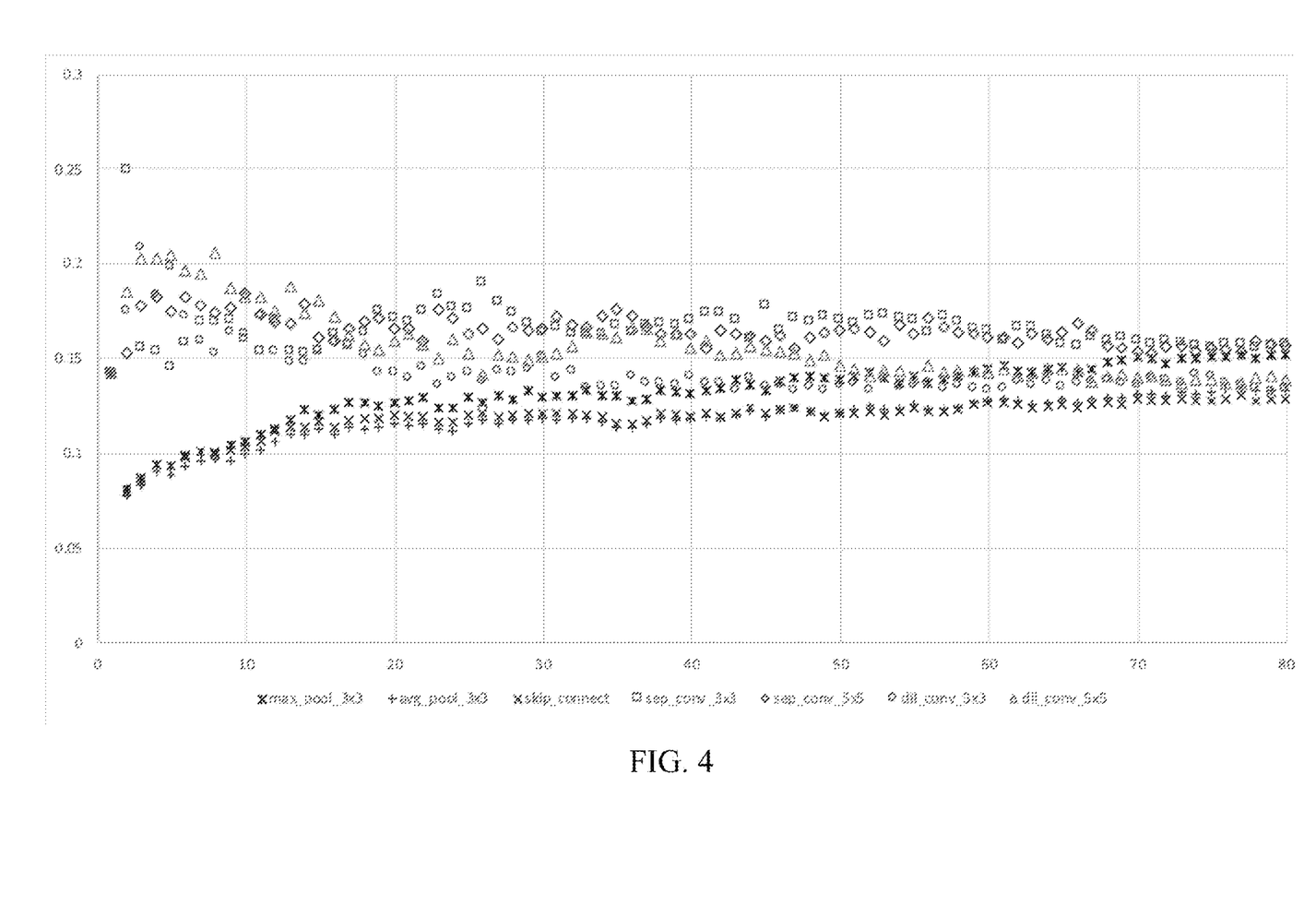
FIG. 4 depicts operator distribution for a lower layer, according to embodiments of the present disclosure.
Figure 5:
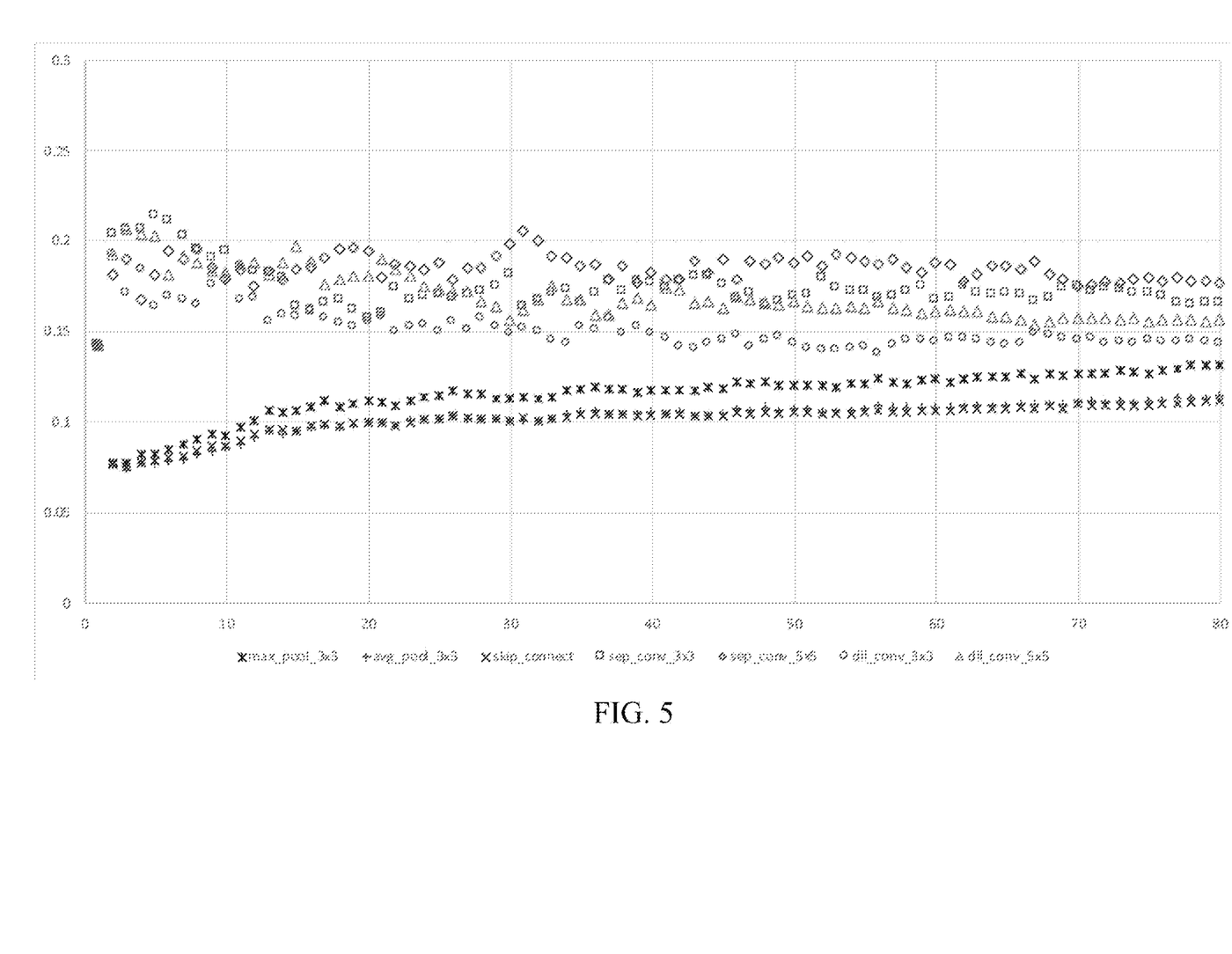
FIG. 5 depicts operator distribution for a middle layer, according to embodiments of the present disclosure.
Figure 6:
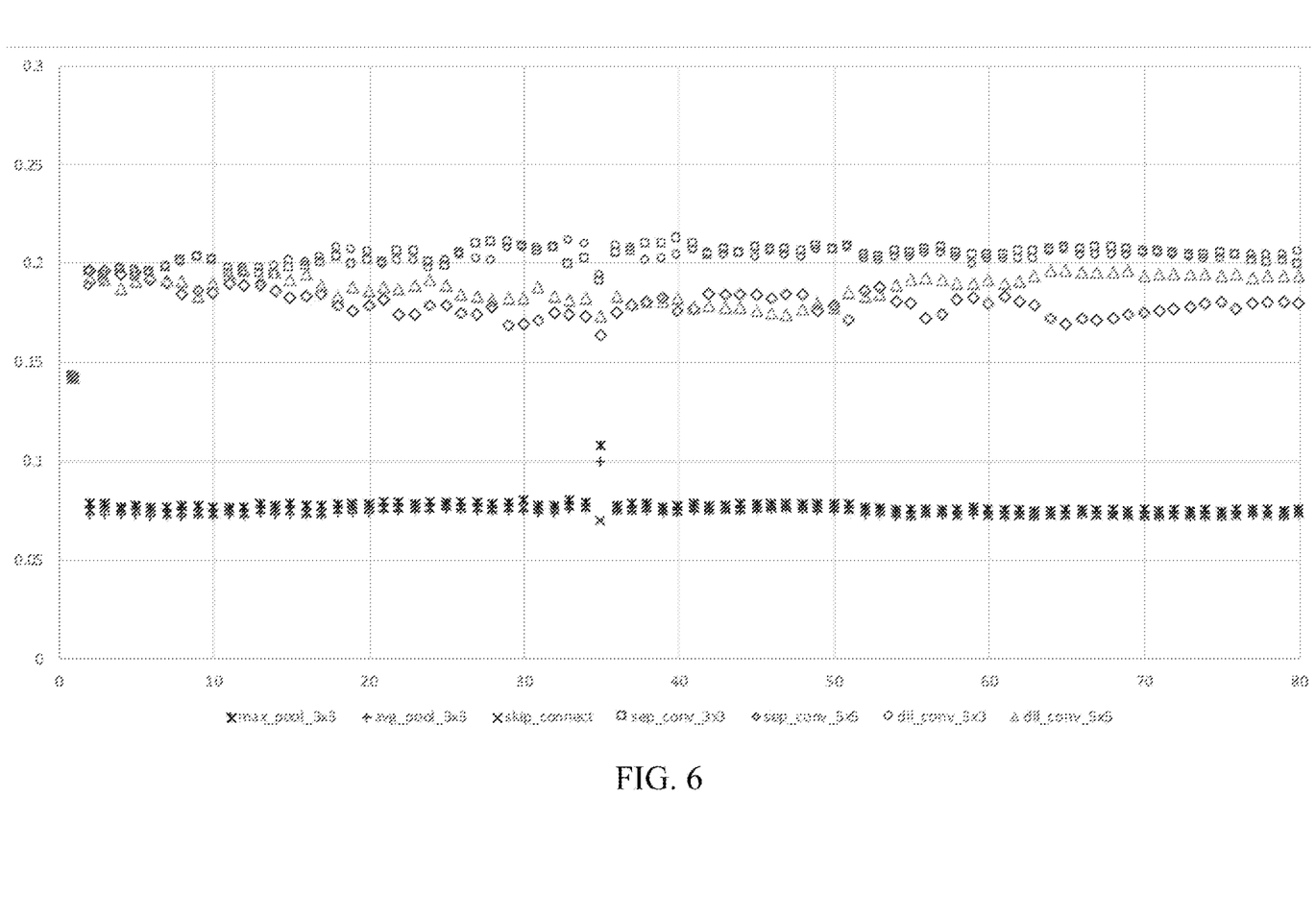
FIG. 6 depicts operator distribution for a top layer, according to embodiments of the present disclosure.

To verify the effectiveness of the similarity of operators proposed herein, some experiments were implemented to show its ranking consistency in terms of similarity in the training process of supernet. FIGS. 4, 5, and 6 show the operators' probability distribution in the searching process from random different layer in the low, middle, and top part of a supernet, which is built based on 20 cells. From these Figures, it may be noticed that the operators tend to be consistent in terms of their similarity no matter what layers they are in a whole network.

2. Results

The dataset is a typical benchmark dataset that includes approximately 60,000 color images in 10 classes, with approximately 6000 images per class. The dataset may be used for image classification tests. An embodiment of the methodology presented herein was applied to the dataset and a promising accuracy of 97.18% was obtained.

D. Some Conclusions

NAS has been a popular research topic recently and most supernet based approaches take the general approach of weight sharing to reduce the search cost. Presented herein are embodiments that, for the first time, analyze each operator's influence in the supernet. Also presented are embodiments of a simple and effective NAS approach. In one or more embodiments, the similarity of each operator with the average outputs of different operators is used as a ranking criterion for different operators in the supernet. In one or more embodiments, a similarity-based comparison process ensures the ranking performance. To further reduce the search process, an operator clustering procedure may also be applied.

E. Computing System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more disk drives, one or more network ports for communicating with external devices as well as various input and output (I/O) devices, such as a keyboard, mouse, stylus, touchscreen and/or video display. The computing system may also include one or more buses operable to transmit communications between the various hardware components.

Figure 7:
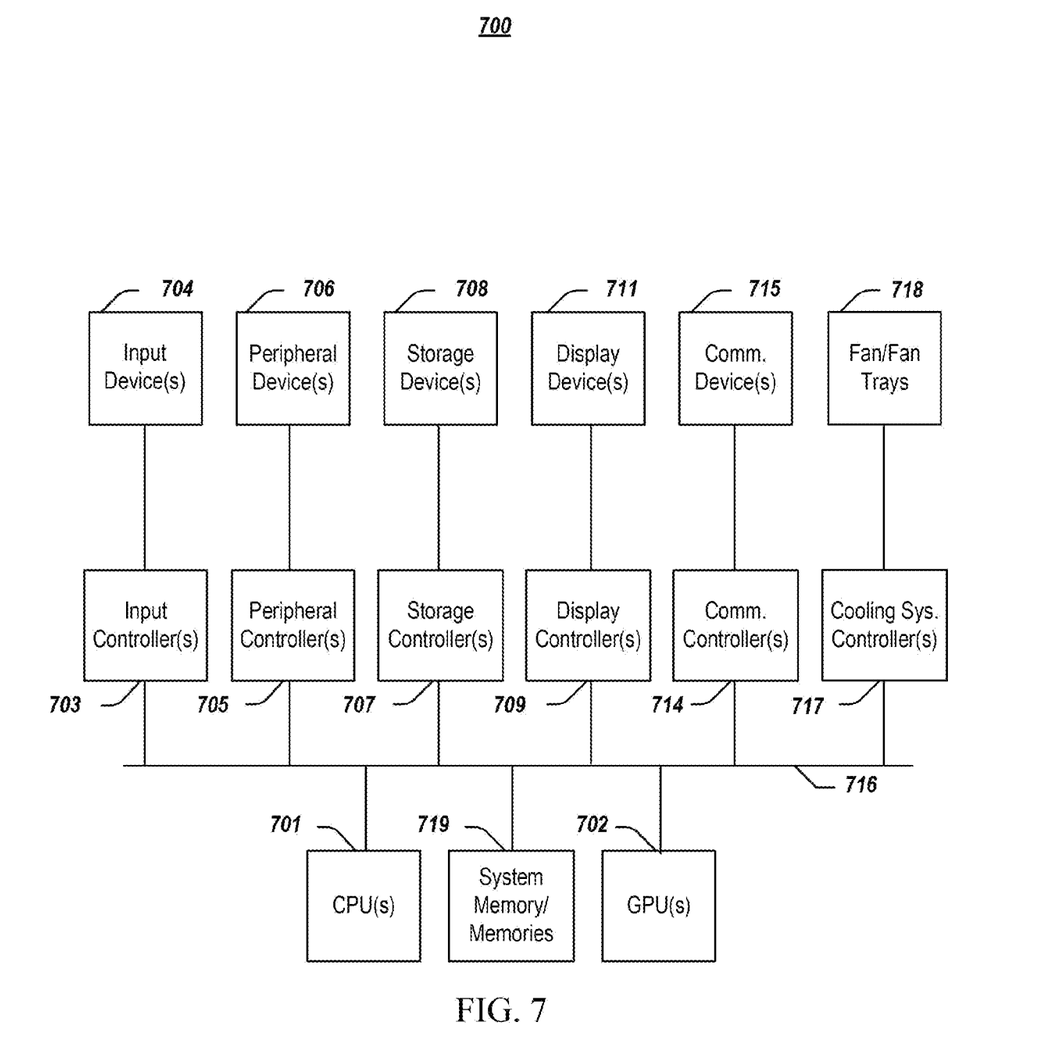
FIG. 7 depicts a simplified block diagram of a computing device/information handling system, according to embodiments of the present disclosure.

FIG. 7 depicts a simplified block diagram of an information handling system (or computing system), according to embodiments of the present disclosure. It will be understood that the functionalities shown for system 700 may operate to support various embodiments of a computing system— although it shall be understood that a computing system may be differently configured and include different components, including having fewer or more components as depicted in FIG. 7.

As illustrated in FIG. 7, the computing system 700 includes one or more central processing units (CPU) 701 that provide computing resources and control the computer. CPU 701 may be implemented with a microprocessor or the like, and may also include one or more graphics processing units (GPU) 702 and/or a floating-point coprocessor for mathematical computations. In one or more embodiments, one or more GPUs 702 may be incorporated within the display controller 709, such as part of a graphics card or cards. The system 700 may also include a system memory 719, which may comprise RAM, ROM, or both.

A number of controllers and peripheral devices may also be provided, as shown in FIG. 7. An input controller 703 represents an interface to various input device(s) 704, such as a keyboard, mouse, touchscreen, and/or stylus. The computing system 700 may also include a storage controller 707 for interfacing with one or more storage devices 708 each of which includes a storage medium such as magnetic tape or disk, or an optical medium that might be used to record programs of instructions for operating systems, utilities, and applications, which may include embodiments of programs that implement various aspects of the present disclosure. Storage device(s) 708 may also be used to store processed data or data to be processed in accordance with the disclosure. The system 700 may also include a display controller 709 for providing an interface to a display device 711, which may be a cathode ray tube (CRT) display, a thin film transistor (TFT) display, organic light-emitting diode, electroluminescent panel, plasma panel, or any other type of display. The computing system 700 may also include one or more peripheral controllers or interfaces 705 for one or more peripherals 706. Examples of peripherals may include one or more printers, scanners, input devices, output devices, sensors, and the like. A communications controller 714 may interface with one or more communication devices 715, which enables the system 700 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 700 comprises one or more fans or fan trays 718 and a cooling subsystem controller or controllers 717 that monitors thermal temperature(s) of the system 700 (or components thereof) and operates the fans/fan trays 718 to help regulate the temperature.

In the illustrated system, all major system components may connect to a bus 716, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for performing neural network architecture search comprising:
pre-training a supernet to obtain a second set of operators for each layer of a set of layers of the supernet by performing steps comprising:
iterating, until a stop condition is reached, steps comprising:
determining a comparative similarity score for each operator of a first set of operators in each layer of the set of layers of the supernet;
for each layer of the set of layers, calculating an impact value for each operator, by determining the impact value for each operator at a layer by combining the comparative similarity scores between the operator and each other operator at that layer;
for each layer of the set of layers, sampling operators based upon their impact to select a first subset of operators to form a model, by determining a sampling based upon a ratio comprising overall iterations per impact of the operator divided by a summation of reciprocals of the impacts of the operators for the layer; and
training the model with the selected first subset of operators using a training data set; and
responsive to the stop condition having been reached, outputting the supernet with the second set of operators in each layer of the set of layers of the supernet being pre-trained; and
obtaining a final network by performing steps comprising:
for each layer of the set of layers of the supernet, determining a similarity score for each operator for that layer of the supernet;
iterating steps until a threshold level or below number of operators exists for each layer of the set of layers, the steps comprising:
for at least each layer of the set of layers of the supernet that has a plurality of operators, removing an operator with a minimum similarity score for that layer of the supernet;
forming a new model which comprises, for each layer, a second subset of operators selected from operators that remain for that layer;
training the new model using a training data set, in which at least some weights in the new model are updated as part of training; and
using a validation data set on the trained new model to obtain similarity scores of operators used in the layers; and
responsive to that the threshold level or below number of operators exists for each layer of the set of layers, outputting the trained new model of a last iteration as the final network comprising an operation for each layer of the set of layers of the final network;
wherein for each operator at each layer of the set of layers of the supernet, the similarity score for that operator at that layer represents a similarity measure between an output for that operator at that layer and an average output of that layer.

2. The computer-implemented method of claim 1 wherein the similarity score represents how similar feature output for an operator at a layer is relative to a combined feature output for a plurality of operators at the layer.

3. The computer-implemented method of claim 2 wherein the similarity score is a cosine similarity value or other distance-based similarity measure.

4. The computer-implemented method of claim 1 wherein a comparative similarity score for an operator in a layer of the supernet represents a similarity measure between a feature output for an operator at the layer relative to a feature output for a single other operator at the layer or relative to a feature output for a plurality of operators at the layer.

5. The computer-implemented method of claim 1 wherein sampling may be determined by:
for at least one layer, reducing the second set of operators by removing one or more operators that are functionally similar to another operator in the second set of operators.

6. A system comprising:
one or more processors; and
a non-transitory computer-readable medium or media comprising one or more sets of instructions which, when executed by at least one of the one or more processors, causes steps to be performed comprising:
pre-training a supernet to obtain a second set of operators for each layer of a set of layers of the supernet by performing steps comprising:
iterating, until a stop condition is reached, steps comprising:
determining a comparative similarity score for each operator of a first set of operators in each layer of the set of layers of the supernet;
for each layer of the set of layers, calculating an impact value for each operator, by determining the impact value for each operator at a layer by combining the comparative similarity scores between the operator and each other operator at that layer;
for each layer of the set of layers, sampling operators based upon their impact to select a first subset of operators to form a model, by determining a sampling based upon a ratio comprising overall iterations per impact of the operator divided by a summation of reciprocals of the impacts of the operators for the layer; and
training the model with the selected first subset of operators using a training data set; and
responsive to the stop condition having been reached, outputting the supernet with the second set of operators in each layer of the set of layers of the supernet being pre-trained; and
obtaining a final network by performing steps comprising:
for each layer of the set of layers of the supernet, determining a similarity score for each operator for that layer of the supernet;
iterating steps until a threshold level or below number of operators exists for each layer of the set of layers, the steps comprising:
for at least each layer of the set of layers of the supernet that has a plurality of operators, removing an operator with a minimum similarity score for that layer of the supernet;
forming a new model which comprises, for each layer, a second subset of operators selected from operators that remain for that layer; and
training the new model using a training data set, in which at least some weights in the new model are updated as part of training; and
using a validation data set on the trained new model to obtain similarity scores of operators used in the layers; and
responsive to that the threshold level or below number of operators exists for each layer of the set of layers, outputting the trained new model of a last iteration as the final network comprising an operation for each layer of the set of layers of the final network;
wherein for each operator at each layer of the set of layers of the supernet, the similarity score for that operator at that layer represents a similarity measure between an output for that operator at that layer and an average output of that layer.

7. The system of claim 6 wherein the similarity score represents how similar feature output for an operator at a layer is relative to a combined feature output for a plurality of operators at the layer.

8. The system of claim 6 wherein a comparative similarity score for an operator in a layer of the supernet represents a similarity measure between a feature output for an operator at the layer relative to a feature output for a single other operator at the layer or relative to a feature output for a plurality of operators at the layer.

9. The system of claim 6 wherein sampling may be determined by:
for at least one layer, reducing the second set of operators by removing one or more operators that are functionally similar to another operator in the second set of operators.

10. A non-transitory computer-readable medium or media comprising one or more sequences of instructions which, when executed by one or more processors, causes steps to be performed comprising:
pre-training a supernet to obtain a second set of operators for each layer of a set of layers of the supernet by performing steps comprising:
iterating, until a stop condition is reached, steps comprising:
determining a comparative similarity score for each operator of a first set of operators in each layer of the set of layers of the supernet;
for each layer of the set of layers, calculating an impact value for each operator, by determining the impact value for each operator at a layer by combining the comparative similarity scores between the operator and each other operator at that layer;
for each layer of the set of layers, sampling operators based upon their impact to select a first subset of operators to form a model, by determining a sampling based upon a ratio comprising overall iterations per impact of the operator divided by a summation of reciprocals of the impacts of the operators for the layer; and
training the model with the selected first subset of operators using a training data set; and
responsive to the stop condition having been reached, outputting the supernet with the second set of operators in each layer of the set of layers of the supernet being pre-trained; and
obtaining a final network by performing steps comprising:
for each layer of the set of layers of the supernet, determining a similarity score for each operator for that layer of the supernet;
iterating steps until a threshold level or below number of operators exists for each layer of the set of layers, the steps comprising:

for at least each layer of the set of layers of the supernet that has a plurality of operators, removing an operator with a minimum similarity score for that layer of the supernet;

forming a new model which comprises, for each layer, a second subset of operators selected from operators that remain for that layer;

training the new model using a training data set, in which at least some weights in the new model are updated as part of training; and using a validation data set on the trained new model to obtain similarity scores of operators used in the layers; and responsive to that the threshold level or below number of operators exists for each layer of the set of layers, outputting the trained new model of a last iteration as the final network comprising an operation for each layer of the final network;

wherein for each operator at each layer of the set of layers of the supernet, the similarity score for that operator at that layer represents a similarity measure between an output for that operator at that layer and an average output of that layer.

11. The non-transitory computer-readable medium or media of claim 10 wherein the similarity score represents how similar feature output for an operator at a layer is relative to a combined feature output for a plurality of operators at the layer.

12. The non-transitory computer-readable medium or media of claim 10 wherein a comparative similarity score for an operator in a layer of the supernet represents a similarity measure between a feature output for an operator at the layer relative to a feature output for a single other operator at the layer or relative to a feature output for a plurality of operators at the layer.

* * * * *